(12) United States Patent
Moebus et al.

(10) Patent No.: US 9,883,354 B2
(45) Date of Patent: Jan. 30, 2018

(54) METHOD AND SYSTEM FOR LOCALIZING A VEHICLE AND VEHICLE WITH A DEVICE FOR CARRYING OUT VEHICLE-TO-X COMMUNICATIONS

(71) Applicant: GM GLOBAL TECHNOLOGY OPERATIONS LLC, Detroit, MI (US)

(72) Inventors: Marco Moebus, Mainz (DE); Nikolas Wagner, Eltville-Rauenthal (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 67 days.

(21) Appl. No.: 15/007,954

(22) Filed: Jan. 27, 2016

(65) Prior Publication Data

US 2017/0215046 A1 Jul. 27, 2017

(30) Foreign Application Priority Data

Jan. 28, 2015 (DE) .................. 10 2015 001 016

(51) Int. Cl.
*H04W 4/04* (2009.01)
*G01S 13/06* (2006.01)
*G01S 19/51* (2010.01)
*G01S 5/02* (2010.01)
*H04W 4/02* (2009.01)

(52) U.S. Cl.
CPC .......... *H04W 4/046* (2013.01); *G01S 5/0252* (2013.01); *G01S 13/06* (2013.01); *G01S 19/51* (2013.01); *H04W 4/023* (2013.01); *H04W 4/028* (2013.01)

(58) Field of Classification Search
CPC ......... H04W 4/046; H04W 4/12; G01C 21/26
See application file for complete search history.

(56) References Cited

U.S. PATENT DOCUMENTS

2011/0077862 A1* 3/2011 Huang .................. G01C 21/30
701/532
2013/0083679 A1* 4/2013 Krishnaswamy ...... G08G 1/093
370/252
2014/0342756 A1 11/2014 Houri
2015/0192657 A1 7/2015 Engel

FOREIGN PATENT DOCUMENTS

DE        102012224110 A1    6/2014

OTHER PUBLICATIONS

German Patent Office, German Search Report for German Application No. 102015001016.6, dated May 19, 2015.

* cited by examiner

*Primary Examiner* — Myron K Wyche
(74) *Attorney, Agent, or Firm* — Lorenz & Kopf LLP (57) ABSTRACT

A method for localizing a vehicle using vehicle-to-X communications is disclosed which provides improved position data. Signals from at least one object arranged outside a vehicle are received using a receiving unit arranged in the vehicle. A signal strength of the received signals is respectively measured and first position data of the vehicle is obtained by utilizing a determined position of using object. Second position data is determined based on the first position data. The signal strength or a change in the received signal strength is incorporated into the determination of the second position data.

19 Claims, 5 Drawing Sheets

METHOD AND SYSTEM FOR LOCALIZING A VEHICLE AND VEHICLE WITH A DEVICE FOR CARRYING OUT VEHICLE-TO-X COMMUNICATIONS

CROSS-REFERENCE TO RELATED APPLICATION

This application claims priority to German Patent Application No. 102015001016.6, filed Jan. 28, 2015, which is incorporated herein by reference in its entirety.

TECHNICAL FIELD

The present disclosure pertains to a method for localizing a vehicle using vehicle-to-X communications, a system for localizing a vehicle and a vehicle that is equipped with a device for carrying out vehicle-to-X communications featuring a receiving unit and an evaluation unit for determining position data of the vehicle.

BACKGROUND

Driver assistance systems are generally known and increasingly utilized in vehicles, in particular, in order to increase the vehicle safety. Particularly a system for the exact position determination or localization of a vehicle within the vehicle surroundings is of great interest to the development of improved driver assistance systems in order to thereby ensure additionally increased safety and a smooth traffic flow.

It is furthermore known to transmit data between vehicles or between a vehicle and the infrastructure using vehicle-to-X communications. In this case, additional data can be made available using vehicle-to-X communications, which are also referred to as Car2Car or vehicle-to-vehicle (V2V) communications, and processed further by the driver assistance system of the vehicle.

Publication DE 10 2012 014 397 A1 describes a method for determining a position of a vehicle, in which an object in the surroundings of the vehicle is detected using a sensor. Data values indicating the position of the object are taken into consideration in the determination of a relative position of the vehicle to the object. In order to determine the relative position of the vehicle, an angle between a straight line, on which the sensor and the object are positioned, and a reference direction is respectively deter mined at two different points in time. In addition, the length of the distance traveled by the vehicle between the two points in time is also determined. There is an need in the art to further increase the reliability and accuracy of conventional vehicle localization while at the same time eliminating any existing deficiencies.

SUMMARY

According to an aspect of the present disclosure, a method for localizing a vehicle using vehicle-to-X communications is disclosed. Signals from at least one object arranged outside the vehicle are received using a receiving unit arranged in the vehicle, wherein a received signal strength of the signals is respectively measured. Preliminary position data of the vehicle is initially obtained by utilizing a determined position of the object. Second position data based on the first position data is then obtained. The second position data particularly is improved or verified in comparison with the first position data, wherein the received signal strength or a change in the received signal strength is incorporated into the determination of the second position data.

According to an aspect of the present disclosure, a system for localizing a vehicle using vehicle-to-X communications is also disclosed. The system includes a receiving unit that is arranged in a vehicle to be localized. The receiving unit is designed for receiving signals from at least one object arranged outside the vehicle. The system furthermore includes an evaluation unit for determining position data of the vehicle. The evaluation unit is designed for obtaining first position data of the vehicle by utilizing a determined position of the object and for generating second position data based on the first position data in that the received signal strength or a change in the received signal strength is incorporated into the determination of the second position data.

According to another aspect of the present disclosure, a vehicle equipped with a device for carrying out vehicle-to-X communications is furthermore disclosed. In this case, the device includes a receiving unit for receiving signals originating from at least one object arranged outside the vehicle and an evaluation unit for determining position data of the vehicle. The evaluation unit is designed for obtaining first position data of the vehicle by utilizing a determined position of the object and for generating second position data based on the first position data in that the received signal strength or a change in the received signal strength is incorporated into the determination of the second position data.

Highly accurate vehicle localization is thereby realized, in particular, in urban and other difficult surroundings. Furthermore, a position estimating accuracy can be improved. This is achieved, in particular, in that the signal intensity or signal intensity change received from an object can be incorporated into the determination of the vehicle position in addition to the information resulting from the data transmitted with the signals.

According to an aspect of the present disclosure, the measurable quality of the signal transmission can be continuously utilized as an exploitable parameter that may result in additional information or correction. According to an aspect, an additional benefit is therefore drawn from already existing information sources, namely the data signals to be transmitted, such that the reliability of the transmitted information can be increased and errors can be corrected or at least the detected. This is particularly useful for reducing the noise, with which transmission channels used for vehicle-to-X communications are normally afflicted. The robustness of the positioning system can thereby also be increased.

Since the measured signal intensities are utilized in addition to the transmitted position data, the odometric measurements of a positioning system can now also be improved. This can be advantageously utilized, for example, in the tracking of vehicle positions, particularly of the own vehicle.

According to a preferred embodiment of the present disclosure, a plausibility check of the preliminary position data of the vehicle is carried out by analyzing a time history of the received signal intensities. If an indication of an inconsistency or implausibility is detected during the plausibility check of the preliminary position data, a correction of the preliminary position data can be carried out in response. A time difference may also be incorporated into the plausibility check and the signal processing. This may be a time difference, for example, between points in time assigned to successive sets of preliminary positions. Furthermore, a current speed of the vehicle may be taken into consideration. In this case, it can be determined, for example, if a current speed of the vehicle matches a measured change of the vehicle position.

According to another embodiment, the corresponding preliminary position data can be discarded if it is categorized as implausible.

According to another embodiment of the present disclosure, a correction of the preliminary position data may furthermore be carried out based on the analyzed course of the received signal strengths. For this purpose, a corresponding change of the position data can be calculated based on a change in the received signal strength and the position data can be corrected/adapted accordingly. Particularly an extrapolation or interpolation of the preliminary position data may be carried out in this case.

According to a preferred embodiment, using object arranged outside the vehicle is a stationary object that, in particular, forms part of the infrastructure such as, for example, a Road Side Unit or a stationary vehicle. This object may ostensively speaking form an ambient mark or landmark for the vehicle. This makes it possible to measure relative distances to fixed points in the vehicle surroundings such that the vehicle can localize itself better in its surroundings.

According to an embodiment, a distance estimation may be carried out based on the received signal strengths of the signals. In order to localize the vehicle, it is preferred to determine the difference between the position of using object and the position of the vehicle in this case: propagation model of the signals may be used for this purpose, wherein a relative distance between using object and the vehicle can be determined using such a propagation model. Since the propagation models are well-established, a distance to the transmitter can be estimated with the aid of the signal strength, as well as regularly measured and thereby updated. The signals of the object arranged outside the vehicle may be radio waves or radar waves, wherein the signals includes, in particular, of data signals that respectively feature a timestamp.

The position data may contain a GPS position of the object. In this case, a difference between the GPS position of the object and the GPS position of the vehicle may be determined in order to obtain the preliminary position data. The transmitted signals can be used for a trilateration. The signals can preferably also be used for a triangulation. This makes it possible to reduce ambiguities and to further confine the search area for the actual position.

The step of obtaining the first, preliminary position data and the step of determining the second position data may be carried out continuously. The method preferably also makes it possible to track the vehicle position. The own position of the vehicle is preferably detected with the method. According to another embodiment, the determined position data may also be transmitted to other devices or vehicles.

The above-described examples may also be advantageously combined. For example, an absolute position of a stationary object, in this case a Road-Side-Unit, is used in one embodiment. In this case, it is assumed that the position of the stationary object, i.e. the Road-Side-Unit, can be determined very accurately and furthermore is continuously measured by the vehicle, for example, based on the transmission of the GPS position of the Road-Side-Unit. In addition, the own position of the vehicle is continuously determined and the difference between the absolute position of the Road-Side-Unit and the position of the vehicle is likewise determined. Since this difference determination provides an accurate distance of the vehicle with respect to its surroundings, this data can be used as odometry source for tracking the vehicle position.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
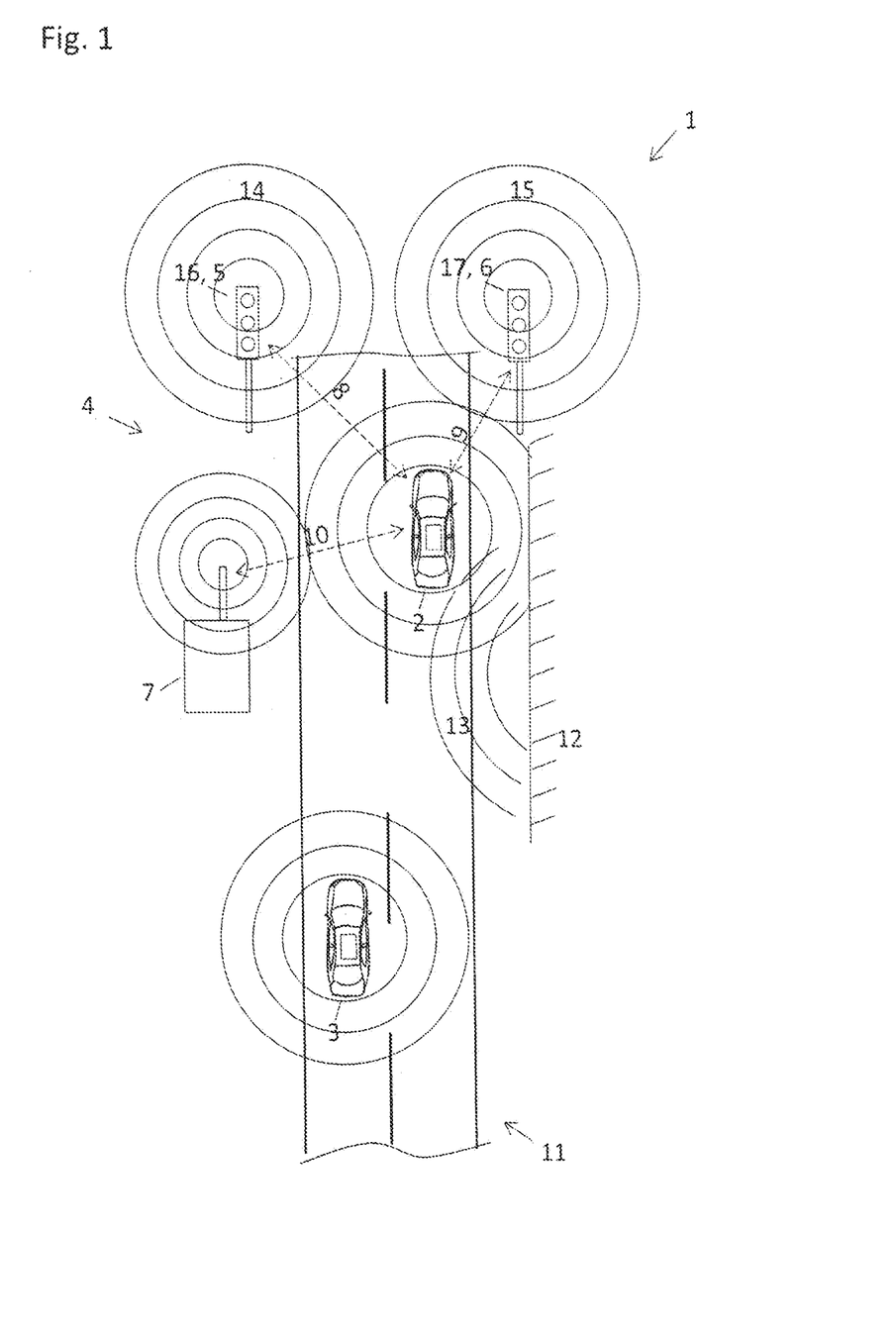
FIG. 1 shows a highly simplified drawing of an exemplary street scenario with vehicles that communicate with the surroundings using vehicle-to-X communications according to an embodiment of the present disclosure.

FIG. 1 shows a simplified drawing of an exemplary street scenario 1 with vehicles 2, 3 that communicate with the surroundings using vehicle-to-X communications according to an embodiment of the present disclosure. A communications network 4 is established using the vehicle-to-X communications. In this case, the communications can typically take place using the modulated electromagnetic waves, preferably via radio. For example, a WLAN network established by devices arranged in one or more of the vehicles 2, 3 and/or by a device arranged in the infrastructure may be used for the vehicle-to-X communications. In FIG. 1, as well as in FIG. 5 that is described further below, the characteristic feature of exchanging data as a communication partner in a vehicle-to-X communications network is respectively indicated with concentric circles that are intended to symbolize emitted and received radio waves. However, the respectively emitted or received signal strengths are not explicitly illustrated. Although the vehicles 2, 3 shown includes of passenger cars in this example, the vehicles 2, 3 may also include trucks or other vehicles equipped with means for participating in the vehicle-to-X communications. Although only two vehicles are illustrated in this example, there may also be other vehicles, with which data is exchanged within the communications network 4. In addition to the vehicles 2, 3, the network 4 also contains infrastructure units 5, 6 that include traffic lights 5, 6 in this example. The network furthermore includes remaining communication partners, of which the unit 7 is illustrated as an example.

According to the embodiment shown, a plurality of vehicle sensors and/or receiving devices is initially available to the vehicles 2, 3 in order to determine the vehicle position and to detect the surroundings. Such vehicle sensors or receiving devices include, for example, GPS units, cameras, ultrasonic sensors, radar systems, laser scanners or similar devices. In this case, data signals transmitted using vehicle-to-vehicle communications are also used for localizing the vehicle 2, 3. Consequently, data determined by external sensors can also be transmitted to a respective vehicle 2, 3 as part of the vehicle-to-X communications. This makes it possible to establish a distributed sensor network, the collective data of which can be used by a single vehicle 2, 3 in order to gain a comprehensive understanding of the immediate vehicle surroundings. For example, warnings are out a critical traffic situation can be transmitted between the vehicles 2, 3. This makes it possible to increase the traffic safety.

The number of communication partners in the vehicle-to-X communications network 4 depends, among other things, on the respective range of the radio links. In this case, a direct communication link does not necessarily have to exist between each of the communication partners. For example, it would be conceivable that only the vehicle 2 is connected to the unit 7 and directly receives data from the unit 7 whereas the vehicle 3 only receives data transmitted by the unit 7 in an indirect fashion, for example, via the vehicle 2 that acts as an intermediate station or via another channel. The vehicles 2, 3 and the infrastructure units 5, 6 may also feature interfaces to other networks such as, for example, the Internet in order to acquire relevant driving data that can be used by the vehicle 2, 3 itself and/or transmitted to other vehicles using vehicle-to-X communications.

The infrastructure units 5, 6 can transmit signals 14, 15 into the surroundings. With respect to the electronics of the localization devices arranged in the vehicles 2, 3, the infrastructure units 5, 6 or the traffic lights 5, 6 represent stationary objects 16, 17 that are arranged outside the respective vehicle and transmit signals 14, 15 that can be used for the localization thereof. For the vehicles 2, 3, the signals 14, 15 received by the respective vehicles 2, 3 have a limited or fluctuating signal quality depending on the surroundings. For example, ambiguities and interferences with respect to the signals can therefore occur. Furthermore, the noise level is also dependent on the respective circumstances. The vehicle-to-vehicle communications can also be impaired by undesirable reflections of the radio waves or negatively influenced by obstacles formed, for example, by street canyons. In FIG. 1, this is symbolized by a barrier 12 that is arranged adjacent to the street 11 and from which reflected waves 13 originate.

According to the embodiment shown, the traffic lights 5, 6 are provided with a GPS receiver or at least with their current GPS position. The GPS position is typically programmed into the traffic light systems or was initialized upon their commissioning. Furthermore, the vehicles 2, 3 are respectively equipped with a GPS receiver. The infrastructure units 5, 6 or the traffic lights 5, 6 continuously transmit their GPS position into the surroundings such that this GPS position is received, in particular, by the vehicle 2. Furthermore, the unit 7 also continuously transmits its GPS position. In this way, the vehicle 2 can localize itself such that its position within the vehicle surroundings in the street scenario 1, as well as the relative distances 8, 9, 10 between the vehicles 2, 3 and the traffic lights 5, 6 or the unit 7, can be determined. In FIG. 1, the relative distances 8, 9, 10 are symbolized with distance arrows and identified by reference symbols. A relatively accurate distance can be obtained in this way by forming the difference between the position of the respective object and the position of the own vehicle. This localization process is carried out within certain time intervals in order to continuously provide an updated vehicle position.

In addition, the vehicles 2, 3 evaluate the received signal strengths of the signals 14, 15. Signal strength changes are also registered and processed in this case. This is particularly advantageous because the traffic lights 5, 6 are stationary objects 16, 17. The signal strengths are actively incorporated into the determination of the vehicle position by the vehicle-to-vehicle communications system. The evaluation of this additional information on the signal strength or signal strength changes makes it possible, for example, to compensate the signal noise.

However, the evaluation of the signal strengths is not limited to stationary objects such as infrastructure units. In fact, signals originating from stationary vehicles can also be incorporated into the evaluation of the signal strength in addition to different types of infrastructure units such as Roadside-Units. For example, if it is known that one of the vehicles 2, 3 is currently at a standstill, the moving vehicle 2, 3 will register the stationary vehicle 2, 3 as a stationary object arranged outside the vehicle 2, 3 and also determine the corresponding received signal strengths in addition to the data content of the signals transmitted by the vehicle 2, 3.

According to an aspect of the present disclosure, the signal strengths of objects can also be evaluated without carrying out a corresponding data evaluation of the signals. This may be the case, in particular, if a current position of the objects 16, 17 is already known.

Figure 2:
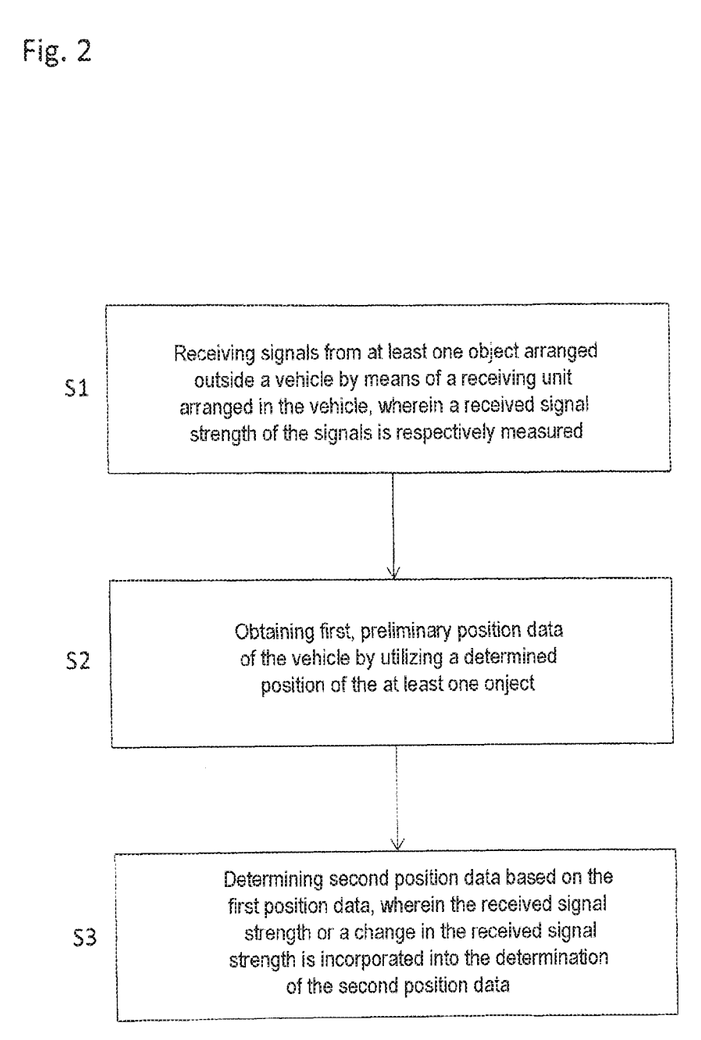
FIG. 2 shows a sequence of a method for localizing a vehicle according to an embodiment of the present disclosure.

FIG. 2 shows an exemplary sequence of a method for localizing a vehicle according to an embodiment of the present disclosure. In step S1, signals 14, 15 of at least one object 16, 17 arranged outside the vehicle 2, 3 are received by a receiving unit arranged in the vehicle 2, 3, wherein a received signal strength of the signals is respectively measured. In step S2, first, preliminary position data of the vehicle 2, 3 is obtained by utilizing a determined position of using object 16, 17. Second position data is determined in step S3 based on the first position data, wherein the received signal strength or a change in the received signal strength is incorporated into the determination of the second position data.

Figure 3:
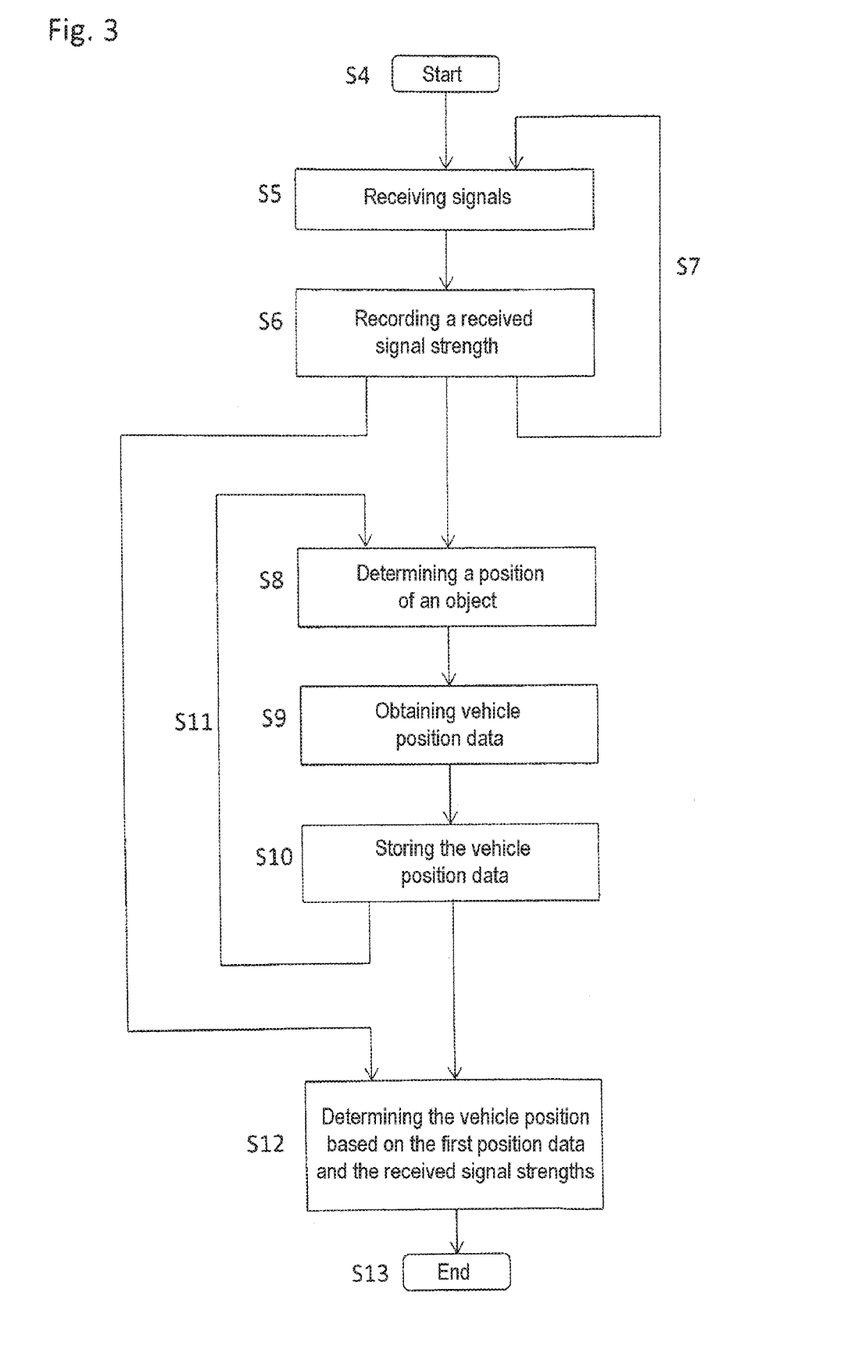
FIG. 3 shows a sequence of a method for localizing a vehicle according to another embodiment of the present disclosure.

FIG. 3 shows an exemplary sequence of a method for localizing a vehicle according to another embodiment of the present disclosure. According to FIG. 3, the method starts in step S4. In step S5, signals 14, 15 are received from at least one object 16, 17 arranged outside the vehicle 2, 3 by a receiving unit arranged in the vehicle 2, 3. The instantaneous reception strength of the respective signals 14, 15 is recorded in step S5. The two steps S4 and S5 are carried out continuously as indicated with the loop S7 in the drawing. The position of an object 16, 17 is determined in step S8. This step S8 can be carried out separately for each of the objects 16, 17. It is preferred to use three or more different objects 16, 17, the respective position of which can be determined. The position is preferably determined based on the signals 14, 15, wherein the signals 14, 15 may respectively contain, in particular, a GPS position of the respective objects 16, 17. Preliminary vehicle position data is obtained in step S9, wherein this determination of the vehicle position data is carried out based on the positions of the objects 16, 17 determined in step S8. The position data obtained in step S9 is stored in a memory of the vehicle localization system in the form of first, preliminary position data of the objects 16, 17. The position data is preferably stored in an evaluation unit arranged in the vehicle 2, 3 to be localized. The steps S7-S9 can preferably be carried out continuously in order to thereby update the preliminary position data stored in the memory of the system as indicated with the loop S11.

In step S12, the vehicle position is determined based on the stored first, preliminary position data and the received signal strengths. Corrections of the preliminary position data can be carried out, in particular, based on the signal strengths. In this way, the accuracy of the vehicle localization is improved and noise can be compensated or reduced. The method is concluded in step S13. In different embodiments of the present disclosure, additional steps are carried out between steps S4-S13, particularly between steps S4 and S5 and between steps S12 and S13. For example, the determined vehicle position can be transmitted to another vehicle 2, 3. Steps S5-S12 can be correspondingly adapted with respect to the current vehicle surroundings.

Figure 4:
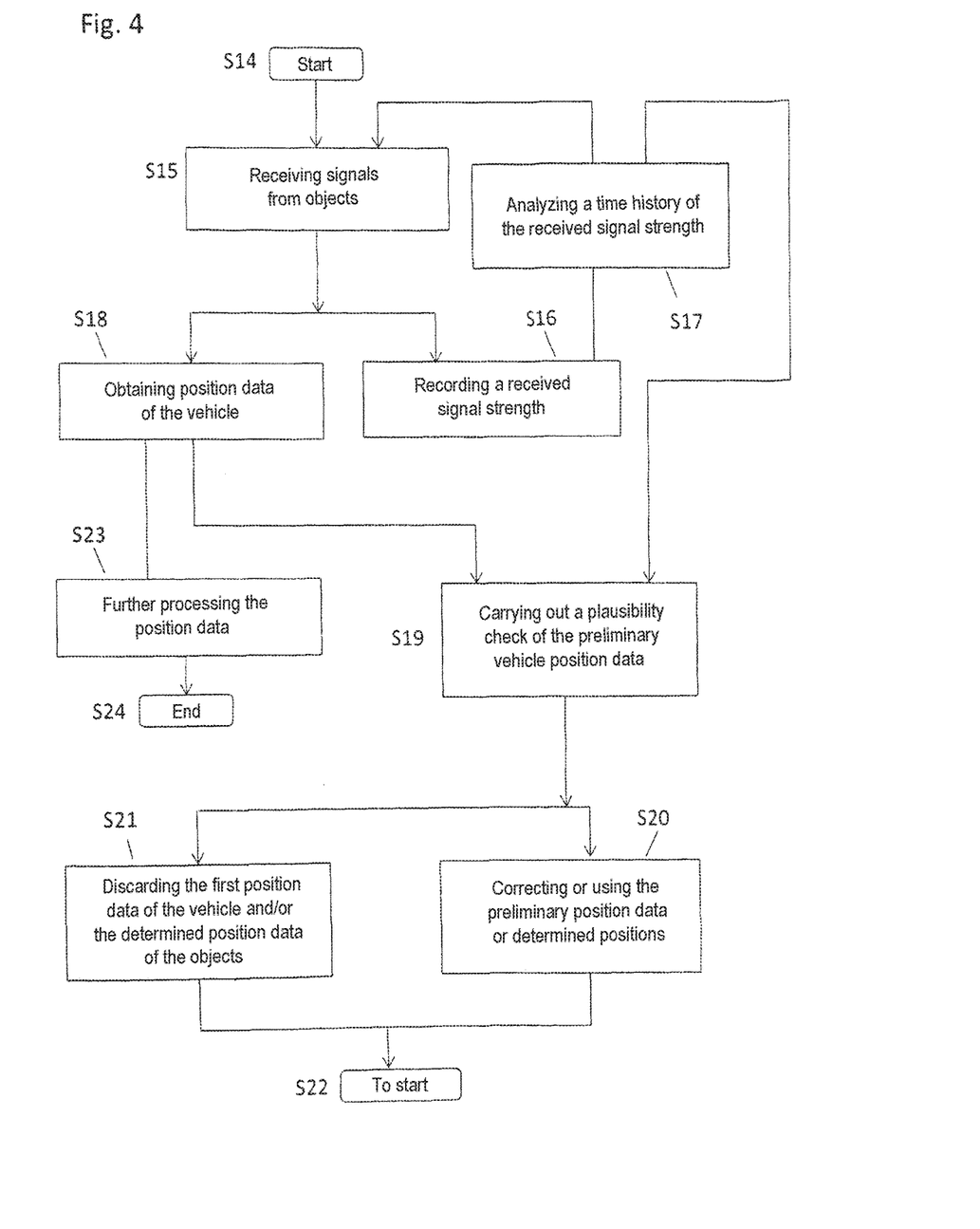
FIG. 4 shows a sequence of a method for localizing a vehicle according to yet another embodiment of the present disclosure.

FIG. 4 shows a sequence of a method for localizing a vehicle according to an embodiment of the present disclosure. The method starts with step S14. In step S15, signals are received, for example, from a Road-Side Unit or another stationary object. In this context, signals are preferably received from a plurality of objects in step S14. Position data of the vehicle is obtained in step S18. This is preferably realized with the aid of the signals received in step S15. Furthermore, the received signal strengths are recorded in step S16. The signal strengths are recorded for example, using a volatile memory. Steps S15 and S16 can be carried out continuously, wherein a time history of the received signal strengths is analyzed in step S17.

A plausibility check of the preliminary position data of the vehicle is carried out in step S19. This is preferably realized using the analysis in step S19. The result of the plausibility check may also indicate an inconsistency of the measuring results in this case. Such an inconsistency may concern the preliminary position data of the vehicle 2, 3 and/or a determined position of the objects 16, 17. In step S21, the position data of the vehicle 2, 3 and/or the determined positions can be corrected if the need for such a correction was determined in step S19. If this is not the case, the position data and the determined positions are used and can be output or processed further. Step S18 does not have to be carried out once again in this case. The current position data is discarded if the position data does not appear plausible and also cannot be corrected, wherein either other available position data can be used or step S18 is preferably repeated.

According to FIG. 4, the method once again returns to step S14 or the start after step S21 or step S20 has been carried out. After carrying out step S23, one cycle of the method is concluded with step 24, wherein the method can be continued and repeated such that highly accurate position data is available for the driver assistance system of the vehicle. A correction of the position data in step S20 may be based on the history of the received signal strengths analyzed in step S17. To this end, a corresponding change of the position data can be calculated based on a change in the received signal strengths and the position data can be corrected accordingly. An extrapolation or interpolation of the preliminary position data is preferably carried out in this case.

In step S18, a distance between the vehicle 2, 3 and an object 16, 17 can be estimated based on the signal strength received in step S16. In this case, it is preferred to use a propagation model of the signals 14, 15 that can be compared with the analysis of the time history of the signal strength carried out in step S17. A trilateration can also be carried out in step S18 based on the determined positions of the objects 16, 17. A signal strength measurements carried out in step S16 can preferably also be used for a triangulation in order to determine the position of the vehicle.

Figure 5:
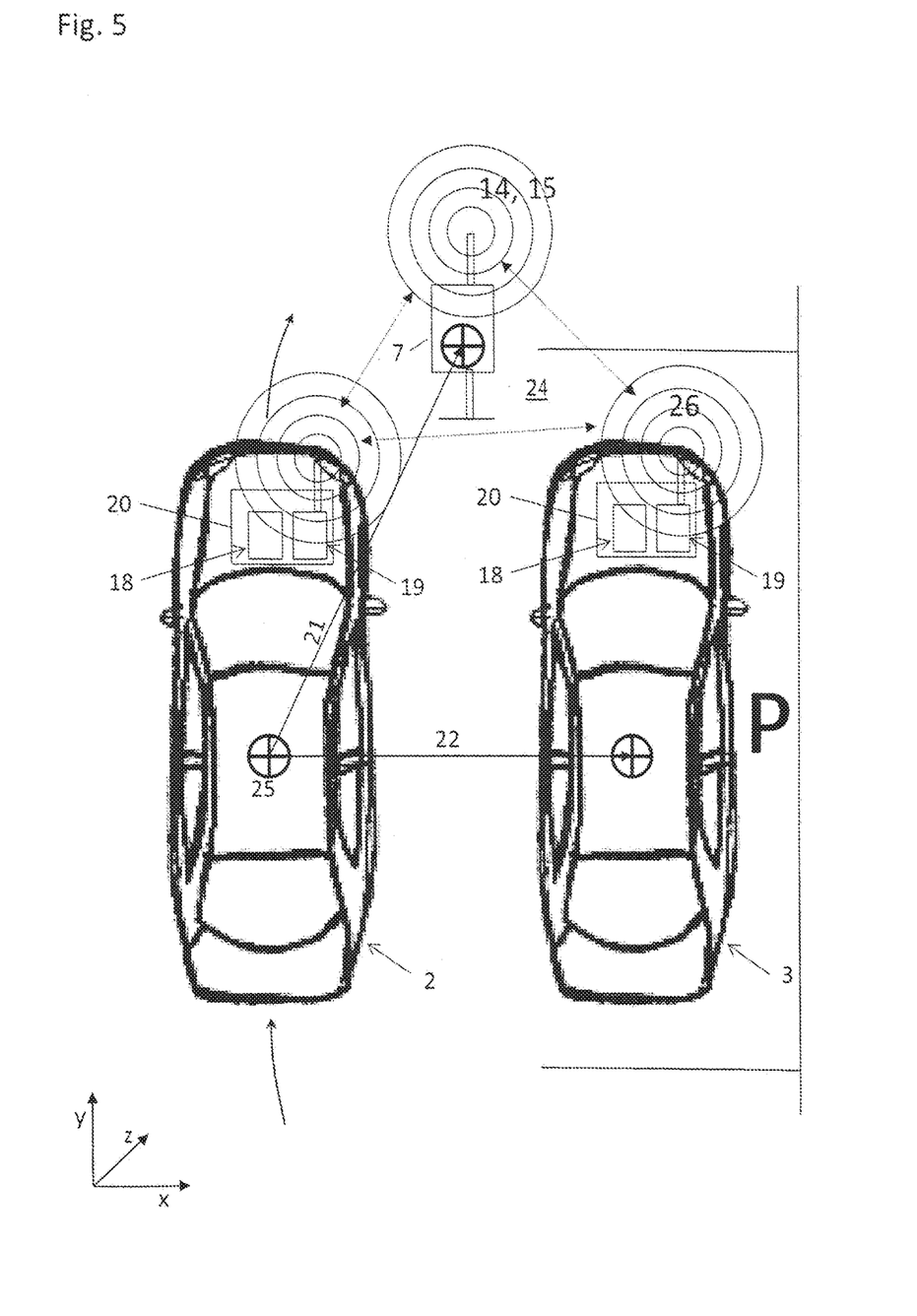
FIG. 5 shows a system for localizing a vehicle using vehicle-to-X communications, as well as a vehicle with a device for carrying out vehicle-to-X communications, according to an embodiment of the present disclosure.

FIG. 5 shows a system 23 for localizing a vehicle using vehicle-to-X communications, as well as vehicles 2, 3 that are respectively equipped with a device 20 for carrying out vehicle-to-X communications, according to an embodiment of the present disclosure. The vehicles 2, 3 in FIG. 5 feature identical devices 20, wherein the vehicle 2 represents a moving vehicle 2 and the vehicle 3 is parked in a parking space and therefore represents a stationary object. According to FIG. 5, a position 24 of the vehicle 2 within an x-y-z coordinate system of the vehicle surroundings can be determined using the system 23. In this context, the position 24 of the vehicle 2 can be determined relative to the corresponding positions 25, 26 of the other communication partners, particularly relative to the stationary vehicle 3 or the stationary unit 7 in this case. The relative distances 21, 22 are thereby determined.

The device 20 of the vehicle 2 to be localized features a receiving unit 19 for receiving signals 14, 15, 26 that originate from objects arranged outside the vehicle 2, wherein the receiving unit 19 in the embodiment shown is realized in the form of a transmitting and receiving unit. The device 20 furthermore features an evaluation unit 18 that is designed for obtaining first, preliminary position data of the vehicle 2 by utilizing a determined position of at least the stationary unit 7 and the stationary vehicle 3. In this case, the evaluation unit 18 can generate second position data based on the first position data in that the received signal strength of the signals 14, 15, 26 or a change in the received signal strength 14, 15, 26 is incorporated into the determination of the second position data.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for localizing a vehicle using vehicle-to-X communications comprising:
   receiving, by a receiving unit of a device of a moving vehicle, signals from another vehicle and from at least one other stationary object arranged outside the moving vehicle;
   determining that the other vehicle comes to a standstill and is a stationary vehicle;
   measuring a received signal strength of the signals;
   obtaining first position data of the moving vehicle by utilizing a determined position of the stationary vehicle and the at least one other stationary object;
   determining second position data based on the first position data and a function of the received signal strength; and
   determining a first relative difference between the moving vehicle and the stationary vehicle and a second relative distance between the moving vehicle and the at least one other stationary object utilizing the second position data.

2. The method according to claim 1, wherein the second position data is determined based on the first position data and a change in the received signal strength.

3. The method according to claim 1, further comprising analyzing a time history of the received signal strengths as a plausibility check on the first position data of the vehicle.

4. The method according to claim 3, further comprising discarding the first position data based on an inconsistency determined during the plausibility check.

5. The method according to claim 3, further comprising correcting the first position data based on an inconsistency determined during the plausibility check.

6. The method according to claim 5, wherein the correction is carried out based on the analyzed time history of the received signal strengths.

7. The method according to claim 3, wherein the plausibility check further comprises computing a time difference between points in time assigned to successive sets of the first position data and/or a current speed of the moving vehicle.

8. The method according to claim 1, wherein the at least one other stationary object arranged outside the vehicle is a stationary object that forms part of the infrastructure.

9. The method according to claim 8, wherein the at least one other stationary object comprises a Road Side Unit.

10. The method according to claim 1, further comprising computing a distance estimation based on the received signal strengths of the signals.

11. The method according to claim 1, further comprising determining the first relative distance and the second relative distance using a propagation model of the signals.

12. The method according to claim 1, wherein the received signals comprises one of radio waves or radar waves or data signals and the received signals include a time stamp and serve to transmit position data of the object.

13. The method according to claim 12, further comprising computing a difference between a GPS position of the object from the position data and the GPS position of the vehicle to determine the first position data of the vehicle.

14. The method according to claim 1, further comprising determining the position of the vehicle using trilateration using the signals.

15. The method according to claim 1, further comprising determining the position of the vehicle using triangulation using the signals.

16. The method according to claim 1 further comprising transmitting the second position data to at least one of another vehicle or an infrastructure component in the form of determined position data of the moving vehicle.

17. The method according to claim 1 further comprising repeatedly carrying out at least one of obtaining the first position data and determining the second position data based on the first position data.

18. The method according to claim 1 further comprising tracking the vehicle position of the moving vehicle.

19. A system for localizing a vehicle using vehicle-to-X communications, comprising:
a receiving unit arranged in a first vehicle to be localized and configured to receive signals originating from a second vehicle and at least one other stationary object arranged outside the first vehicle, wherein position data is transmitted with the signals, the receiving unit configured to determine that the second vehicle comes to a standstill and is a stationary vehicle, the receiving unit configured to measure a received signal strength of the signals; and
an evaluation unit configured to obtain first position data of the first vehicle by utilizing a determined position of the second vehicle and the at least one other stationary object, and generate second position data based on the first position data and a function of the received signal strength.

* * * * *